(12) United States Patent
Kim

(10) Patent No.: US 12,105,628 B2
(45) Date of Patent: Oct. 1, 2024

(54) APPARATUS AND METHOD FOR MANAGING CACHE MEMORY INCLUDING CACHE LINES WITH VARIABLE CACHE LINE CONFIGURATION

(71) Applicant: ELECTRONICS AND TELECOMMUNICATIONS RESEARCH INSTITUTE, Daejeon (KR)

(72) Inventor: Hyun-Mi Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 42 days.

(21) Appl. No.: 17/969,270

(22) Filed: Oct. 19, 2022

(65) Prior Publication Data

US 2023/0124538 A1  Apr. 20, 2023

(30) Foreign Application Priority Data

Oct. 19, 2021 (KR) .................. 10-2021-0139512
Jun. 13, 2022 (KR) .................. 10-2022-0071414

(51) Int. Cl.
*G06F 12/0802* (2016.01)

(52) U.S. Cl.
CPC ...... *G06F 12/0802* (2013.01); *G06F 2212/60* (2013.01)

(58) Field of Classification Search
CPC .................. G06F 12/0802; G06F 2212/60
See application file for complete search history.

(56) References Cited

U.S. PATENT DOCUMENTS

| | | | |
|---|---|---|---|
| 5,721,874 A * | 2/1998 | Carnevale | G06F 12/0886 711/171 |
| 8,954,676 B2 | 2/2015 | Han | |
| 9,824,017 B2 | 11/2017 | Han et al. | |
| 9,996,471 B2 | 6/2018 | Saidi et al. | |
| 11,341,066 B2 | 5/2022 | Han et al. | |
| 2010/0228941 A1* | 9/2010 | Koob | G06F 12/0895 711/212 |
| 2012/0159077 A1* | 6/2012 | Steely, Jr. | G06F 12/0804 711/E12.044 |

(Continued)

FOREIGN PATENT DOCUMENTS

| | | |
|---|---|---|
| KR | 10-2021-0075007 | 6/2021 |
| KR | 10-2021-0090442 | 7/2021 |
| KR | 10-2021-0128903 | 10/2021 |

*Primary Examiner* — Edward J Dudek, Jr.
(74) *Attorney, Agent, or Firm* — KILE PARK REED & HOUTTEMAN PLLC

(57) ABSTRACT

Disclosed herein are an apparatus and method for managing cache memory. The apparatus includes one or more processors and executable memory for storing at least one program executed by the one or more processors. The at least one program reads an s1-tag and an s2-tag of cache memory upon receiving an access request address for reading data in response to a request to access the cache memory, checks whether the access request address matches the value of the s1-tag and the value of the s2-tag, and reads the data from data memory when the access request address matches all of the value of the s1-tag and the value of the s2-tag.

20 Claims, 9 Drawing Sheets

(56) References Cited

U.S. PATENT DOCUMENTS

| | | | | |
|---|---|---|---|---|
| 2015/0121011 A1* | 4/2015 | Huang | ............... | G06F 12/0886 711/128 |
| 2016/0124861 A1* | 5/2016 | Fujii | .................. | G06F 12/0864 711/129 |
| 2021/0326686 A1 | 10/2021 | Abdelaziz et al. | | |

* cited by examiner

FIG. 8

<s1-tag status bit structure>

| status bit [2:0] | | content |
|---|---|---|
| [2] | | valid |
| [1:0] | 0b00 | 128KB granularity |
| | 0b01 | 64KB granularity |
| | 0b02 | 32KB granularity |
| | 0b03 | all zero (sparsity) |

APPARATUS AND METHOD FOR MANAGING CACHE MEMORY INCLUDING CACHE LINES WITH VARIABLE CACHE LINE CONFIGURATION

CROSS REFERENCE TO RELATED APPLICATIONS

This application claims the benefit of Korean Patent Application No. 10-2021-0139512, filed Oct. 19, 2021, and No. 10-2022-0071414, filed Jun. 13, 2022, which are hereby incorporated by reference in their entireties into this application.

BACKGROUND OF THE INVENTION

1. Technical Field

The present invention relates generally to technology for managing cache memory, and more particularly to technology for managing high-efficiency, low-power cache memory for an Artificial Intelligence (AI) processor.

2. Description of the Related Art

In order to implement an AI processor, on-chip memory or a cache is essential for fast data access. Particularly, an AI processor based on high-performance parallel-processing is configured with a system based on shared caches having a multi-level hierarchy, and such caches increase a data reuse rate in on-chip memory, thereby having effects of performance improvement and efficient power consumption. However, in the event of a cache miss, external memory access is required, which significantly degrades operation performance and power consumption performance of a processor. Therefore, a method for reducing a cache miss rate is required. Also, when various structures of a cache do not match with the characteristics of a processor or the characteristics of the program to be run, which may give the opposite effect to the expected performance improvement.

A GPU's Single-Instruction, Multiple-Thread (SIMT) structure is currently one of the most widely used processor structures for processing learning and inference algorithms of AI. This is a high-performance parallel-computing structure configured to perform operation by running thousands of threads using a single instruction. Such a high-performance parallel-computing structure requires a fast computing unit for high performance and high memory bandwidth and consumes a large amount of power, which causes a lot of heat to be generated. Here, in order to provide high memory bandwidth, an L1 data cache having a large cache line size is required. However, a large cache line size increases a cache miss rate depending on data types or operation types and causes an inefficient cache operation, whereby operation performance is decreased and power consumption is increased.

For example, a GPU of NVIDIA sets the cache line size of an L1 cache to 128 Kbytes, thereby enabling a total of 32 threads in a warp to simultaneously access 4-byte words each in memory. However, with the recent development of an AI algorithm, the type of operation data has a size different from a commonly used 4-byte single-precision floating point type or threads fewer than 32 are required in many cases. Accordingly, the size of the data to be processed, the number of threads in use, and the like vary depending on the program to be executed, and a large cache line of 128 Kbytes causes a high cache miss rate when a program that does not satisfy the condition of 4 bytes×32 threads is executed, whereby overall performance of the AI processor is degraded and power consumption thereof is increased.

Meanwhile, Korean Patent Application Publication No. 10-2021-0075007, titled "Cache for AI processor" discloses a cache for an AI processor, which is capable of reducing the number of operations of reading from or writing to external memory by compressing feature data and kernel data corresponding to the operation target of an AI algorithm before being stored in the external memory.

SUMMARY OF THE INVENTION

An object of the present invention is to maximize cache performance in a high-performance AI processor based on high parallelism and to efficiently manage the AI processor by minimizing power consumption.

In order to accomplish the above object, an apparatus for managing cache memory according to an embodiment of the present invention includes one or more processors and executable memory for storing at least one program executed by the one or more processors. The at least one program reads an s1-tag and an s2-tag of cache memory upon receiving an access request address for reading data in response to a request to access the cache memory, checks whether the access request address matches the value of the s1-tag and the value of the s2-tag, and reads the data from data memory when the access request address matches all of the value of the s1-tag and the value of the s2-tag.

Here, the cache memory may be set to include multiple cache lines, and the multiple cache lines may be set to have different numbers of cache line sets based on lengths of the cache lines.

Here, the s1-tag may be a set index and a tag used for each cache line of the cache memory, and the s2-tag may be assigned to each of preset cache line sets in each cache line of the cache memory.

Here, a tag used in common for all of the cache line sets may be stored in memory of the s1-tag, and a tag used for each of the cache line sets may be stored in memory of the s2-tag.

Here, the memory of the s2-tag may be set to indicate which cache line, among the cache lines, has a value of 0 using the value of preset bits in status information.

Here, when the access request address does match the value of the s1-tag, the at least one program may check the value of the preset bits of the status information.

Here, the at least one program may check whether the value of the preset bits of the status information and the value of a first cache line set of the s2-tag match the access request address.

Here, when any one of the value of the preset bits of the status information and the value of the first cache line set of the s2-tag does not match the access request address, the at least one program may check whether a matching cache line set value is present in subsequent cache line sets of the s2-tag.

Here, when the matching cache line set value is not present, the at least one program may process a cache miss, whereas when the matching cache line set value is present, the at least one program may read the data from the data memory.

Also, in order to accomplish the above object, a method for managing cache memory, performed by an apparatus for managing the cache memory, according to an embodiment of the present invention includes reading an s1-tag and an s2-tag of cache memory upon receiving an access request address for reading data in response to a request to access the cache memory, checking whether the access request address matches the value of the s1-tag and the value of the s2-tag, and reading the data from data memory when the access request address matches all of the value of the s1-tag and the value of the s2-tag.

Here, the cache memory may be set to include multiple cache lines, and the multiple cache lines may be set to have different numbers of cache line sets based on lengths of the cache lines.

Here, the s1-tag may be a set index and a tag used for each cache line of the cache memory, and the s2-tag may be assigned to each of preset cache line sets in each cache line of the cache memory.

Here, a tag used in common for all of the cache line sets may be stored in memory of the s1-tag, and a tag used for each of the cache line sets may be stored in memory of the s2-tag.

Here, the memory of the s2-tag may be set to indicate which cache line, among the cache lines, has a value of 0 using the value of preset bits in status information.

Here, checking whether the access request address matches the value of the s1-tag and the value of the s2-tag may comprise checking the value of the preset bits of the status information when the access request address does not match the value of the s1-tag.

Here, checking whether the access request address matches the value of the s1-tag and the value of the s2-tag may comprise checking whether the value of the preset bits of the status information and the value of a first cache line set of the s2-tag match the access request address.

Here, checking whether the access request address matches the value of the s1-tag and the value of the s2-tag may comprise, when any one of the value of the preset bits of the status information and the value of the first cache line set of the s2-tag does not match the access request address, checking whether a matching cache line set value is present in subsequent cache line sets of the s2-tag.

Here, reading the data from the data memory may comprise processing a cache miss when the matching cache line set value is not present; and reading the data from the data memory when the matching cache line set value is present.

BRIEF DESCRIPTION OF THE DRAWINGS

The above and other objects, features, and advantages of the present invention will be more clearly understood from the following detailed description taken in conjunction with the accompanying drawings, in which:

FIG. 8 is a view illustrating the structure of an s1-tag according to an embodiment of the present invention;

DESCRIPTION OF THE PREFERRED EMBODIMENTS

Figure 1:
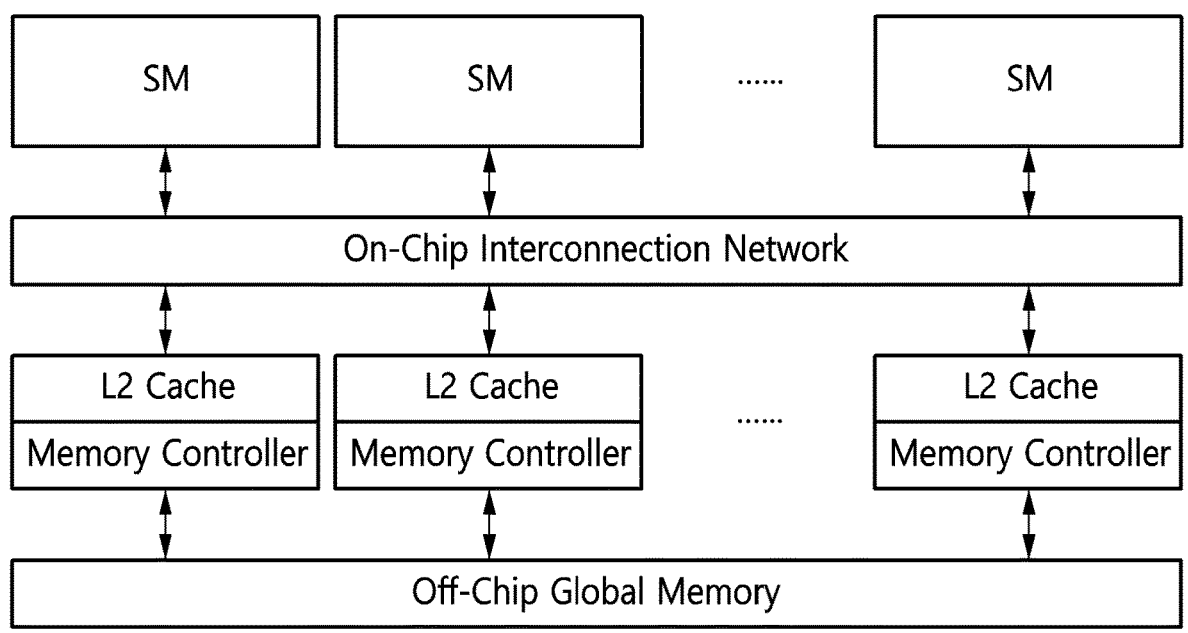
FIG. 1 is a block diagram illustrating an apparatus for managing cache memory for an AI processor according to an embodiment of the present invention.

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

Figure 2:
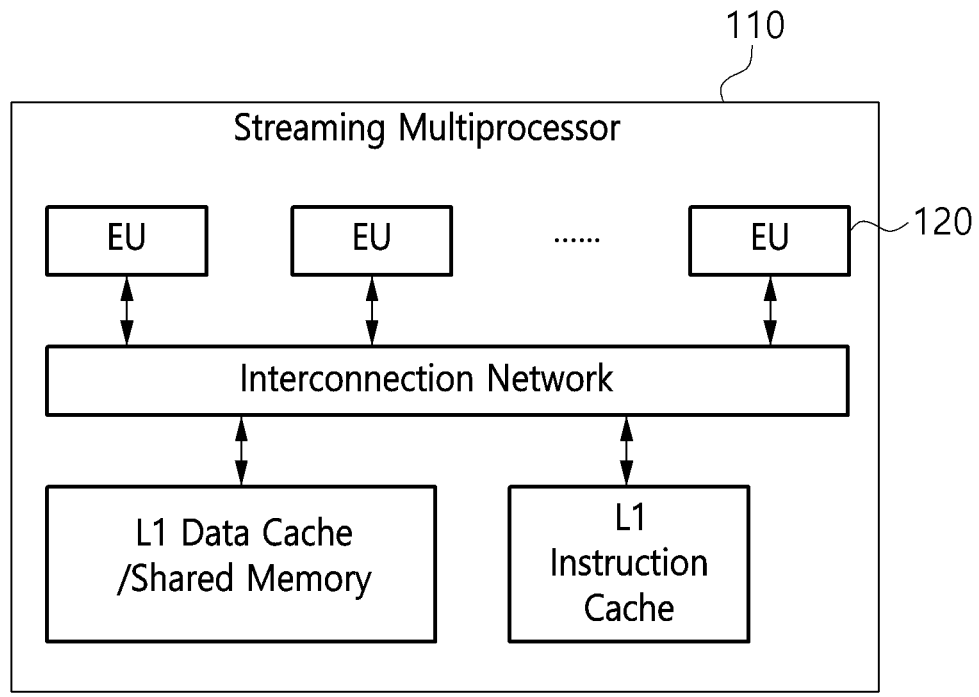
FIG. 2 is a block diagram illustrating in detail an example of the streaming multiprocessor illustrated in FIG. 1.
Figure 3:
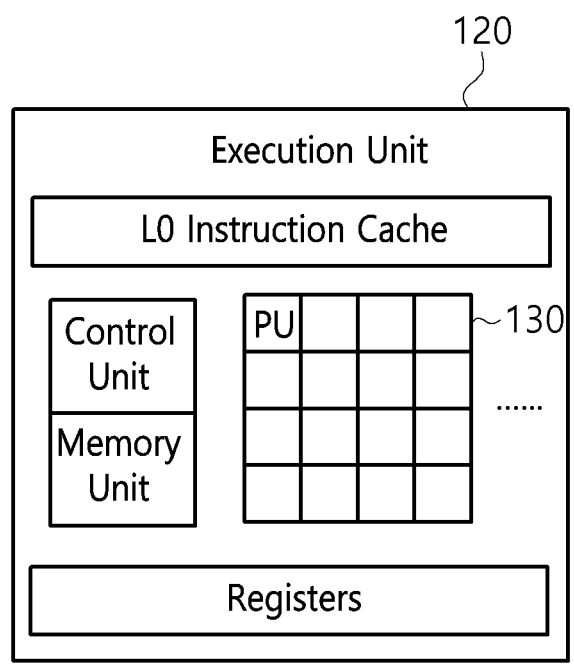
FIG. 3 is a block diagram illustrating in detail an example of the execution unit illustrated in FIG. 2.

FIG. 1 is a block diagram illustrating an apparatus for managing cache memory for an AI processor according to an embodiment of the present invention. FIG. 2 is a block diagram illustrating in detail an example of the streaming multiprocessor illustrated in FIG. 1. FIG. 3 is a block diagram illustrating in detail an example of the execution unit illustrated in FIG. 2.

Referring to FIG. 1, it can be seen that the apparatus for managing cache memory for an AI processor according to an embodiment of the present invention corresponds to a Single-Instruction Multiple-Thread (SIMT) structure of a GPU.

The apparatus for managing cache memory may include multiple streaming multiprocessors, an on-chip interconnection network, L2 caches, and off-chip global memory.

Referring to FIG. 2, the streaming multiprocessor 110 may include multiple execution units EU 120, an interconnection network, an L1 data cache, and an L1 instruction cache.

Referring to FIG. 3, the execution unit 120 may include an L0 instruction cache, a control unit, a memory unit, and a processing unit PU 130.

The processing unit 130 is a basic operating component for operation processing in the execution unit 120.

The memory may be configured hierarchically by being paired with a cluster layer in order to supply data to the processing unit 130 and store an operation result.

The on-chip shared memory and the L1 cache may maximize parallelism by enabling multiple operating components to simultaneously access memory using high bandwidth and low latency.

The present invention configures a cache to be efficiently managed depending on various operations, thereby improving operation performance and power consumption efficiency. Also, because an algorithm processed by an AI processor has a characteristic in that the value of activation data is '0' in many cases, when this characteristic is used for configuration of the cache, power consumption can be further reduced, and efficient cache configuration for an AI processor may become possible.

To this end, the apparatus and method for managing cache memory according to an embodiment of the present invention may provide a variable cache line configuration. Further, when a sparsity characteristic, which indicates that activation data handled for processing of an AI algorithm has a value of '0' in many cases, is used for and combined with the variable cache line configuration, an apparatus for more efficiently managing cache memory for an AI processor may be implemented.

Figure 4:
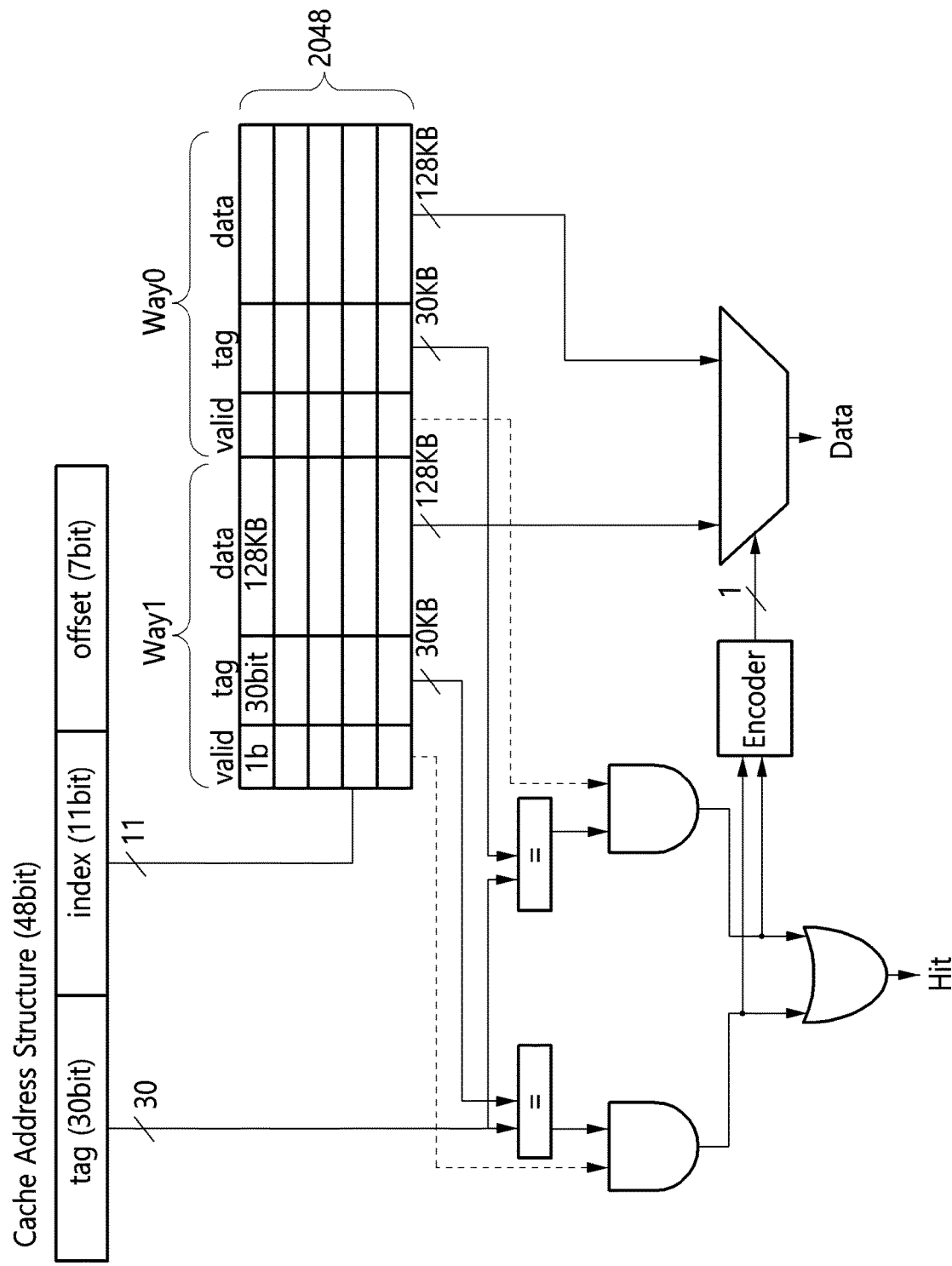
FIG. 4 is a view illustrating a cache address structure according to an embodiment of the present invention.

FIG. 4 is a view illustrating a cache address structure according to an embodiment of the present invention.

Referring to FIG. 4, it can be seen that a 2-way set associative cache address structure having a 48-bit address length and cache lines, each having a size of 128 KB, is illustrated.

A cache is formed based on a set associative cache structure by compromising between a search speed and a storage speed, and may include as many data-memory units and tag-memory units as the number of ways.

Here, it can be seen that tag information indicates address information, excluding index information and byte offset information in address information for a cache line of 128 KB. The tag memory for storing the tag information is configured using physical memory separate from the data memory.

Figure 5:
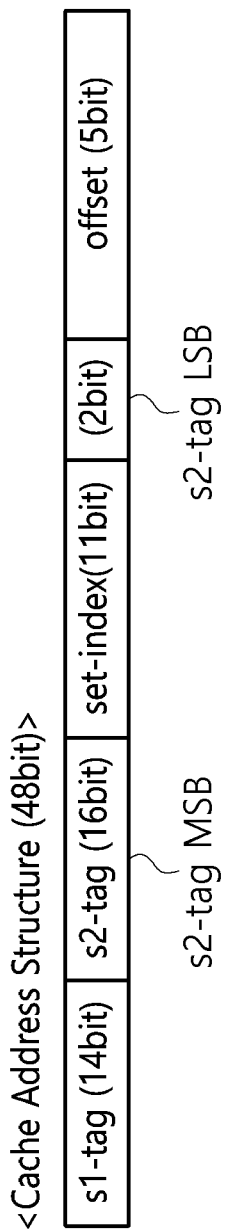
FIG. 5 is a view illustrating the address structure of a cache according to an embodiment of the present invention.
Figure 6:
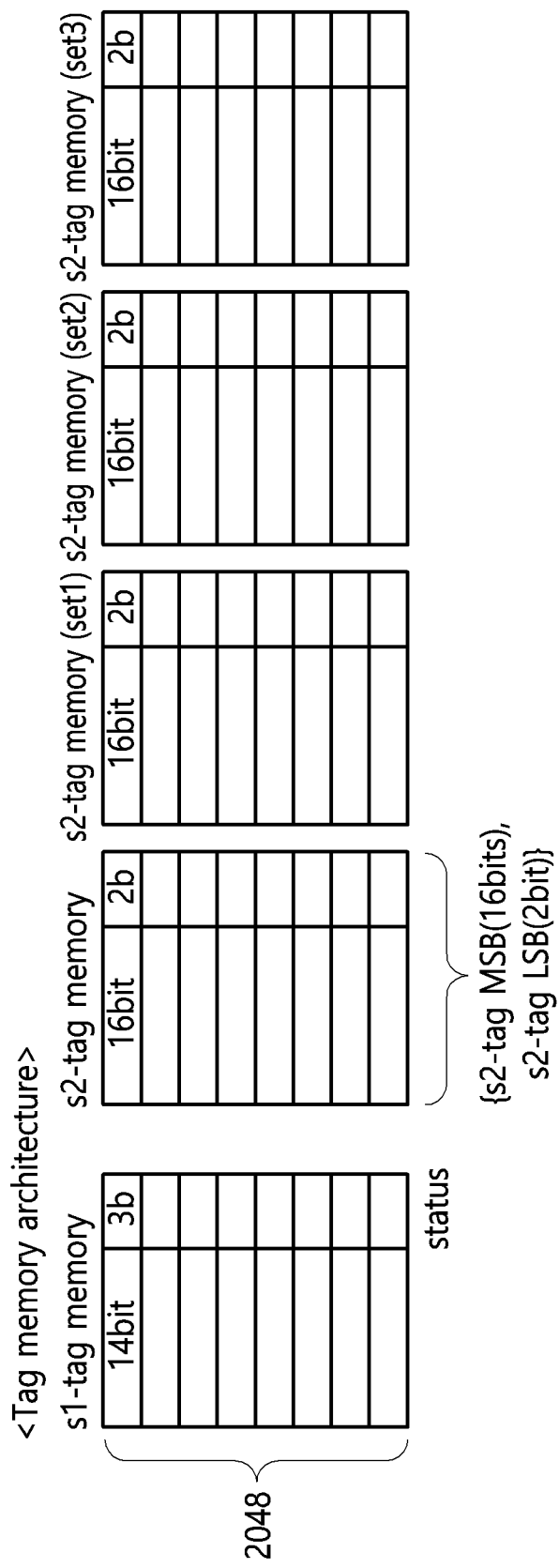
FIG. 6 is a view illustrating a tag memory architecture according to an embodiment of the present invention.
Figure 7:
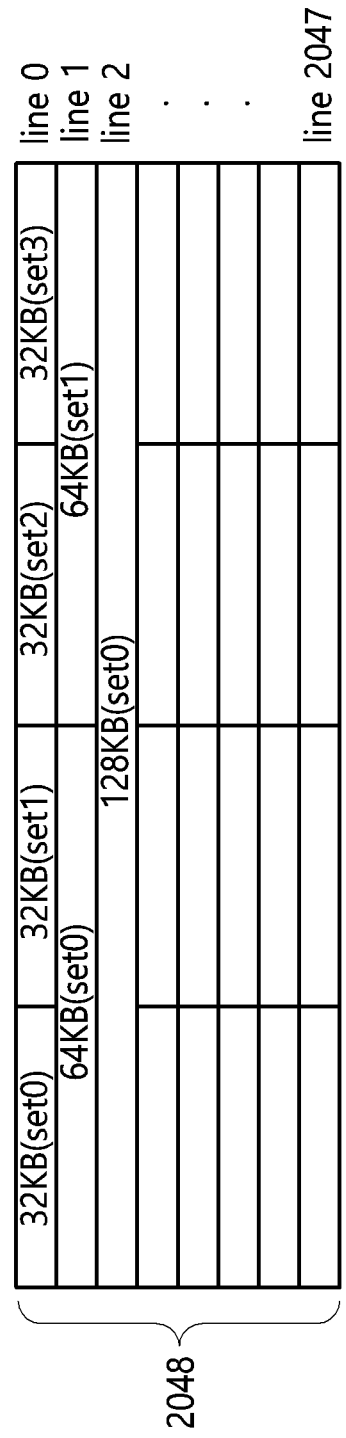
FIG. 7 is a view illustrating a data memory architecture according to an embodiment of the present invention.

FIG. 5 is a view illustrating the address structure of a cache according to an embodiment of the present invention. FIG. 6 is a view illustrating a tag memory architecture according to an embodiment of the present invention. FIG. 7 is a view illustrating a data memory architecture according to an embodiment of the present invention. FIG. 8 is a view illustrating the structure of an s1-tag according to an embodiment of the present invention.

Referring to FIGS. 5 to 8, it can be seen that a cache address structure in which a cache line configuration can be variously set to any of three kinds of cache lines having a size of 128 KB, 64 KB, and 32 KB, a tag memory architecture, a data memory architecture, and the structure of an s1-tag are illustrated.

It can be seen that a tag address includes an s1-tag and an s2-tag.

For example, when the data memory architecture illustrated in FIG. 7 is set to have a cache line length of 32 KB, cache line 0 is divided into four sets, each having a size of 32 KB. Also, cache line 1 is divided into two sets, each having a size of 64 KB, and cache line 2 has one set having a size of 128 KB.

As described above, the cache memory includes multiple cache lines, and the multiple cache lines may be set to have different numbers of cache line sets based on the cache line lengths.

Each cache line of 32 KB is divided into four sets, a tag used in common for the four sets may be stored in s1-tag memory, and tags used for the four respective sets may be stored in s2-tag memory. When memory access is requested, a cache hit/miss may be determined using two tag comparators (an s1-tag comparator and an s2-tag comparator).

As in the cache address structure, an s1-tag value may be formed using a part of the tag field of an existing address value and a part of the offset field thereof.

Here, three bits of status information are added to the S1-tag memory such that one bit is used as a valid bit and the remaining two bits are used to represent a preset granularity bit value, which indicates the granularity of each cache line. Additionally, when all of the granularity bits are set to 1, the data of the corresponding cache line may be set to data all having the value of '0'. Accordingly, when it is determined based on the status information that the data of the corresponding cache line is all zeros, the data memory is not accessed, whereby power consumed for memory access may be saved.

Figure 9:
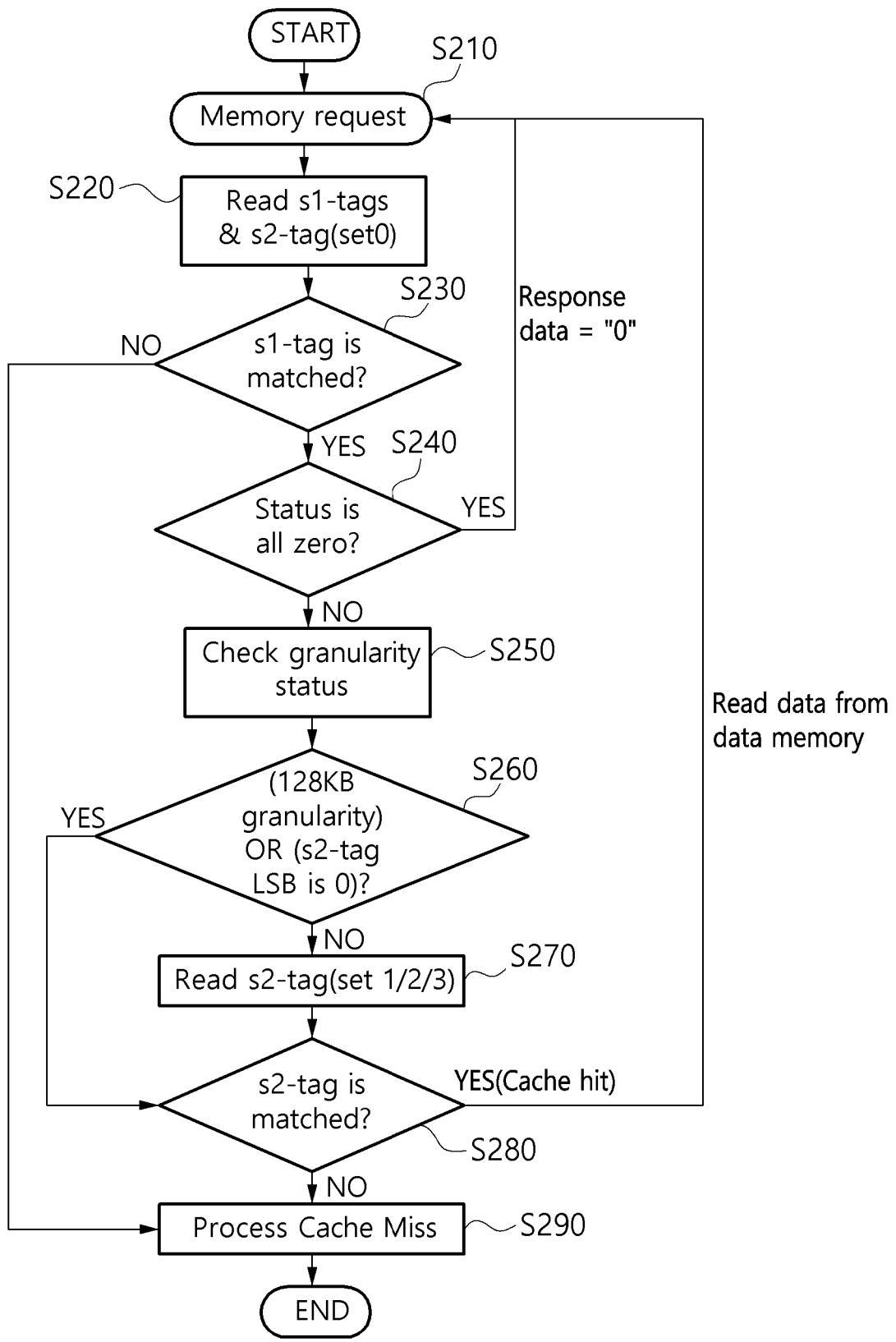
FIG. 9 is a flowchart illustrating a method for managing cache memory according to an embodiment of the present invention.

FIG. 9 is a flowchart illustrating a method for managing cache memory according to an embodiment of the present invention.

Referring to FIG. 9, in the method for managing cache memory according to an embodiment of the present invention, first, a request to access cache memory may be received at step S210.

Also, at step S220, upon receiving the request to access the cache memory, an s1-tag and an s2-tag (set0) may be read.

Here, at step S220, in order to reduce the time taken to access tag memory, an s2-tag (set0) may be read from the tag memory along with the s1-tag.

Also, at step S230, whether the s1-tag matches the s1-tag value of the address to which access is requested may be checked.

Here, at step S230, when the pieces of tag information do not match each other, data may be read from external memory according to a cache miss policy at step S290.

Here, at step S230, when the pieces of tag information match each other, whether status information is 'all zero' may be determined at step S240.

Here, at step S240, when the status information is 'all zero', the value of the data may be returned as 0 without access to data memory at step S210.

Here, at step S240, when the status information is not 'all zero', a granularity status may be checked at step S250.

Here, at step S260, when any one of the granularity value and the least significant bit (LSB) value of the s2-tag is not 'zero', not the s2-tag value of set0 but the s2-tag value of another set may be read at step S270.

Here, at step S270, whether a matching cache line set value is present in the subsequent cache line sets (set 1/2/3 . . . ) of the s2-tag may be checked.

Here, at step S260, when all of the granularity value and the LSB value of the s2-tag are 'zero', the value of the s2-tag may be checked at step S280.

Here, at step S280, whether the s2-tag matches the s2-tag value of the address to which access is requested may be checked.

Here, at step S280, when the s2-tag matches the s2-tag value of the address to which access is requested, a cache hit is confirmed and the data is read from the data memory at step S210, whereas when the s2-tag does not match the s2-tag value of the address to which access is requested, a cache miss may be processed at step S290.

As described above, the apparatus and method for managing cache memory according to an embodiment of the present invention use variable cache lines based on a two-phase cache tag configuration (s1-tag and s2-tag), thereby improving responsiveness to various operations and decreasing a cache miss rate. Also, data sparsity is considered, whereby the efficiency of power consumption for cache access may be improved.

Figure 10:
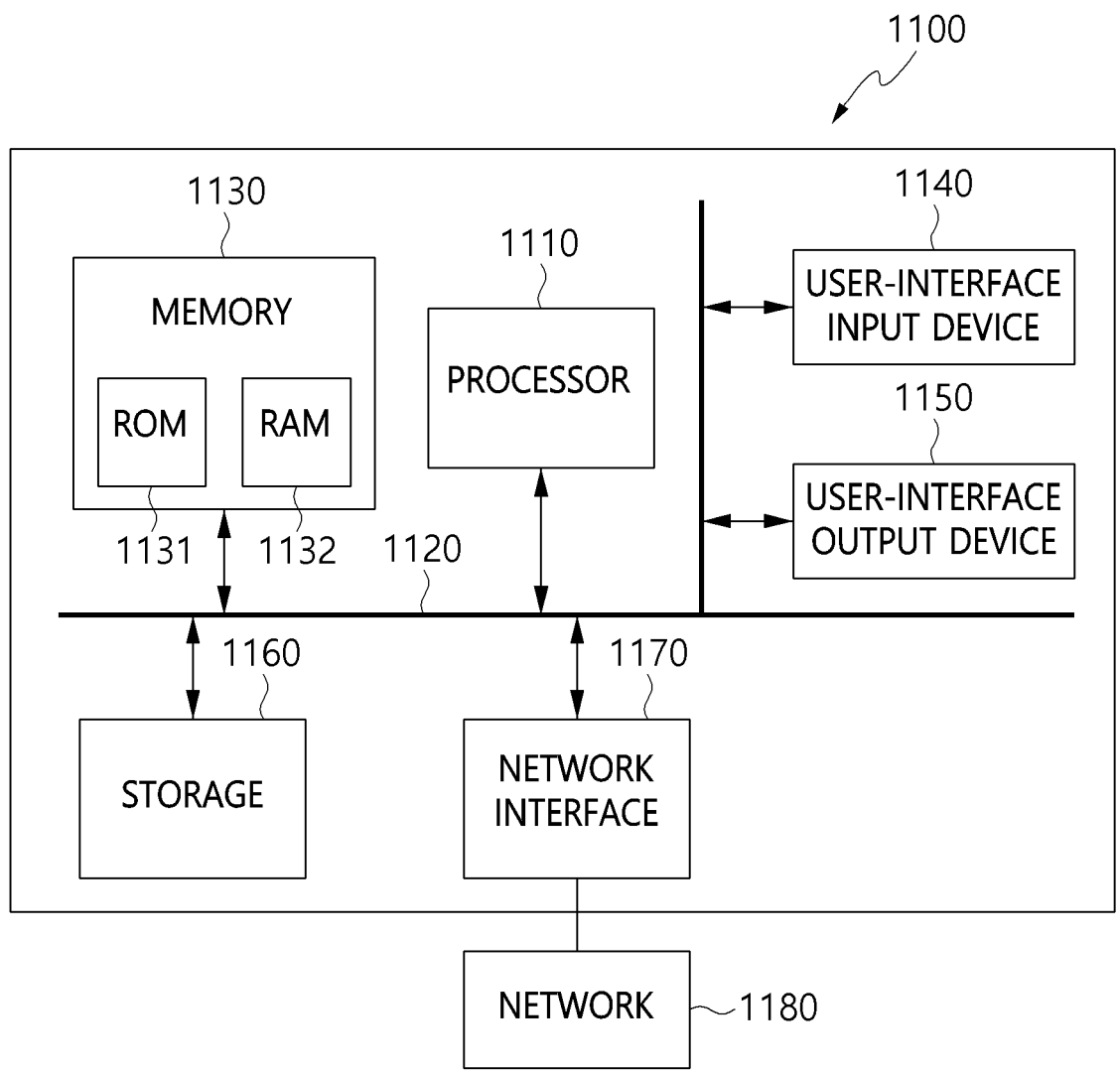
FIG. 10 is a view illustrating a computer system according to an embodiment of the present invention.

FIG. 10 is a view illustrating a computer system according to an embodiment of the present invention.

Referring to FIG. 10, the apparatus 100 for managing cache memory according to an embodiment of the present invention may be implemented in a computer system 1100 including a computer-readable recording medium. As illustrated in FIG. 10, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The apparatus for managing cache memory according to an embodiment of the present invention includes one or more processors 1110 and executable memory 1130 for storing at least one program executed by the one or more processors 1110. The at least one program reads an s1-tag and an s2-tag of the cache memory upon receiving an access request address for reading data in response to a request to access cache memory, checks whether the access request address matches the value of the s1-tag and the value of the s2-tag, and reads the data from data memory when the access request address matches all of the value of the s1-tag and the value of the s2-tag.

Here, the cache memory includes multiple cache lines, and the multiple cache lines may be set to have different numbers of cache line sets depending on the lengths of the cache lines.

Here, the s1-tag is a set index and is a tag used for each cache line of the cache memory, and the s2-tag may be assigned to each of preset cache line sets in each of the cache lines of the cache memory.

Here, a tag used in common for all of the cache line sets is stored in the memory of the s1-tag, and a tag used for each of the cache line sets may be stored in the memory of the s2-tag.

Here, the memory of the s2-tag may be set to indicate which cache line, among the cache lines, has a value of 0 using the value of preset bits in status information.

Here, when the access request address does match the value of the s1-tag, the at least one program may check the value of the preset bits of the status information.

Here, the at least one program may check whether the value of the preset bits of the status information and the value of the first cache line set of the s2-tag match the access request address.

Here, when any one of the value of the preset bits of the status information and the value of the first cache line set of the s2-tag does not match the access request address, the at least one program may check whether a matching cache line set value is present in the subsequent cache line sets of the s2-tag.

Here, when the matching cache line set value is not present in the subsequent cache line sets, the at least one program processes a cache miss, whereas when the matching cache line set value is present, the at least one program may read the data from the data memory.

The present invention may maximize cache performance in a high-performance AI processor based on high parallelism and efficiently manage the AI processor by minimizing power consumption.

As described above, the apparatus and method for managing cache memory according to the present invention are not limitedly applied to the configurations and operations of the above-described embodiments, but all or some of the embodiments may be selectively combined and configured, so the embodiments may be modified in various ways.

What is claimed is:

1. An apparatus for managing cache memory, comprising:
one or more processors; and
executable memory for storing at least one program executed by the one or more processors,
wherein the at least one program is configured to:
read an s1-tag and an s2-tag of cache memory upon receiving an access request address for reading data in response to a request to access the cache memory, a memory of the s1-tag comprising address information identifying a cache line set and status information indicating one of a plurality of different configurable cache line lengths for one or more cache lines of the identified cache line set,
check whether the access request address matches a value of the s1-tag and a value of the s2-tag, and
read the data from data memory when the access request address matches all of the value of the s1-tag and the value of the s2-tag.

2. The apparatus of claim 1, wherein:
the cache memory is set to include a plurality of cache line sets of a same length,
each cache line of a cache line set is set to have a same length, and
at least two of the cache line sets are set to include a different number of cache lines based on lengths of their respective cache lines.

3. The apparatus of claim 2, wherein:
the s1-tag is a tag used for each cache line set of the cache memory, and
the s2-tag is a tag assigned to each of preset cache lines in each cache line set of the cache memory.

4. The apparatus of claim 3, wherein:
a tag used to commonly identify all of the cache lines of a cache line set is stored in memory of the s1-tag, and
a tag used to uniquely identify each individual cache line of a cache line set is stored in memory of the s2-tag.

5. The apparatus of claim 4, wherein the memory of the s1-tag is set to indicate which cache line set, among the cache line sets, has a value of 0 using a value of preset bits in the status information.

6. The apparatus of claim 5, wherein, when the access request address does match the value of the s1-tag, the at least one program is configured to check the value of the preset bits of the status information.

7. The apparatus of claim 6, wherein the at least one program is configured to check whether the value of the preset bits of the status information and a value of a first cache line-set of the s2-tag match the access request address.

8. The apparatus of claim 7, wherein, when any one of the value of the preset bits of the status information and the value of the first cache line of the s2-tag does not match the access request address, the at least one program is configured to check whether a matching cache line-set value is present in subsequent cache lines of the s2-tag.

9. The apparatus of claim 8, wherein:
when the matching cache line value is not present, the at least one program is configured to process a cache miss, and
when the matching cache line value is present, the at least one program is configured to read the data from a data memory portion of the cache line matching the cache line value.

10. The apparatus of claim 1, wherein the memory of the s1-tag is set to indicate whether a cache line set, among the cache line sets, has a value of 0 using a value of preset bits in the first status information.

11. A method for managing cache memory, performed by an apparatus for managing the cache memory, comprising:
  reading an s1-tag and an s2-tag of cache memory upon receiving an access request address for reading data in response to a request to access the cache memory, a memory of the s1-tag comprising address information identifying a cache line set and status information indicating one of a plurality of different configurable cache line lengths for one or more cache lines of the identified cache line set;
  checking whether the access request address matches a value of the s1-tag and a value of the s2-tag; and
  reading the data from data memory when the access request address matches all of the value of the s1-tag and the value of the s2-tag.

12. The method of claim 11, wherein:
  the cache memory is set to include a plurality of cache line sets of a same length,
  each cache line of a cache line set is set to have a same length, and
  at least two of the cache line sets are set to include a different number of cache lines based on lengths of their respective cache lines.

13. The method of claim 12, wherein:
  the s1-tag is a tag used for each cache line set of the cache memory, and
  the s2-tag is a tag assigned to each of preset cache lines in each cache line set of the cache memory.

14. The method of claim 13, wherein:
  a tag used to commonly identify all of the cache lines of a cache line set is stored in memory of the s1-tag, and
  a tag used to uniquely identify each individual cache line of a cache line set is stored in memory of the s2-tag.

15. The method of claim 14, wherein the memory of the s1-tag is set to indicate which cache line set, among the cache line sets, has a value of 0 using a value of preset bits in the status information.

16. The method of claim 15, wherein checking whether the access request address matches the value of the s1-tag and the value of the s2-tag comprises checking the value of the preset bits of the status information when the access request address does match the value of the s1-tag.

17. The method of claim 16, wherein checking whether the access request address matches the value of the s1-tag and the value of the s2-tag comprises checking whether the value of the preset bits of the status information and a value of a first cache line of the s2-tag match the access request address.

18. The method of claim 17, wherein checking whether the access request address matches the value of the s1-tag and the value of the s2-tag comprises, when any one of the value of the preset bits of the status information and the value of the first cache line of the s2-tag does not match the access request address, checking whether a matching cache line value is present in subsequent cache lines of the s2-tag.

19. The method of claim 18, wherein reading the data from the data memory comprises:
  processing a cache miss when the matching cache line value is not present; and
  reading the data from a data memory portion of the cache line matching the cache line valve when the matching cache line value is present.

20. The method of claim 11, wherein the memory of the s1-tag is set to indicate whether a cache line set, among the cache line sets, has a value of 0 using a value of preset bits in the first status information.

* * * * *